United States Patent
Itoh et al.

(10) Patent No.: US 7,525,233 B2
(45) Date of Patent: Apr. 28, 2009

(54) VEHICLE ALTERNATOR

(75) Inventors: Motoki Itoh, Oobu (JP); Yusuke Kawano, Nagoya (JP)

(73) Assignee: Denso Corporation, Kariya (JP)

( * ) Notice: Subject to any disclaimer, the term of this patent is extended or adjusted under 35 U.S.C. 154(b) by 203 days.

(21) Appl. No.: 11/633,409

(22) Filed: Dec. 5, 2006

(65) Prior Publication Data

US 2007/0170809 A1 Jul. 26, 2007

(30) Foreign Application Priority Data

Jan. 26, 2006 (JP) ............................. 2006-018021

(51) Int. Cl.
*H02K 1/22* (2006.01)

(52) U.S. Cl. ..................................... 310/263
(58) Field of Classification Search ................... 310/42, 310/216, 263
See application file for complete search history.

(56) References Cited

U.S. PATENT DOCUMENTS

| 3,571,637 | A | * | 3/1971 | Henningsen et al. ... | 310/156.72 |
| 5,768,763 | A | * | 6/1998 | Yoshihara et al. ............. | 29/598 |
| 6,545,383 | B1 | * | 4/2003 | York .......................... | 310/263 |
| 2007/0090708 | A1 | * | 4/2007 | Takahashi et al. ...... | 310/156.21 |
| 2007/0236098 | A1 | * | 10/2007 | Kusase et al. ............... | 310/263 |

FOREIGN PATENT DOCUMENTS

| JP | A-03-139149 | 6/1991 |
| JP | A-05-083909 | 4/1993 |

* cited by examiner

*Primary Examiner*—Tran N Nguyen
(74) *Attorney, Agent, or Firm*—Oliff & Berridge, PLC

(57) ABSTRACT

A vehicle alternator has a rotor having plural claw poles and a stator placed at the outer circumference of the surface of the rotor. Plural grooves are formed in a specified rear area on a surface of each claw pole faced to the stator. The specified rear area is an approximate rear half area on the surface of the claw pole along a rotating direction of the rotor. The grooves are formed in parallel to each other. Each groove has one or a combination of a U-letter shaped groove having a circulation-arc shaped bottom, a rectangle shaped groove having a rectangle shaped bottom, and the like. The configuration of each claw pole ensures the reduction of generating an eddy current on the surface of each claw pole and thereby prevents a reduction of output power of the vehicle alternator.

8 Claims, 7 Drawing Sheets

VEHICLE ALTERNATOR

CROSS-REFERENCE TO RELATED APPLICATIONS

This application is related to and claims priority from Japanese Patent Application No. 2006-18021 filed on Jan. 26, 2006, the contents of which are hereby incorporated by reference.

BACKGROUND OF THE INVENTION

1. Field of the invention

The present invention relates to a vehicle alternator to be mounted on vehicles such as a passenger car and a truck.

2. Description of the Related Art

It is widely known to generate a higher harmonic magnetic field in a space between a stator and a rotor in a vehicle alternator by the reaction of an armature. Further, it is also known to generate a small local-variation of magnetic filed, called "a slot ripple", in a rotary angle. Such a generation of the slot ripple is based on the variation of a magnetic field resistance between opposed areas faced to each other between the stator and the rotor. Such an alternating magnetic field generated by the variation does not have a bad influence on the stator made of laminated plates, but has an adverse effect of eddy current loss and a hysteresis loss to magnet poles of the rotor made of an iron ingot.

Recent trend on a vehicle technology has strong demand of reducing the fuel consumption of a vehicle, and for this reason, there are necessities of enhancing the performance of the vehicle alternator and of reducing the eddy current loss in the vehicle alternator. In order to meet such strong demands and necessities, conventional technologies, for example, Japanese patent laid open publications JP H3-139149 and JP H5-83909 have disclosed a vehicle alternator having uneven portions formed on surfaces of magnet poles of a rotor in a vehicle alternator. The formation of those uneven portions can prevent the generation of an eddy current.

Although those conventional techniques is capable of eliminating the eddy current loss caused by eddy current flowing through the magnet poles of the rotor in the vehicle alternator, the ratio of the area of the uneven portions to the surface area of the magnet poles becomes larger because those uneven portions are formed on the entire surfaces of the magnet poles of the rotor. If the interval between the surface of the magnet pole of the rotor and the surface of the stator is increased by the formation of the uneven portions, an average length between them is increased and this condition reduces the magnitude of magnetic flux and also reduces the output of the vehicle alternator.

SUMMARY OF THE INVENTION

It is an object of the present invention to provide an improved vehicle alternator capable of reducing an eddy current flowing through the surface of a rotor and of suppressing or preventing the deterioration of the output power of the vehicle alternator.

To achieve the above purposes, the present invention provides a vehicle alternator having a rotor equipped with a plurality of claw poles and a stator placed at an outer circumference of the rotor and faced to the rotor. In the vehicle alternator, plural grooves are formed in a specified rear area on a surface of each claw pole along a rotating direction of the rotor faced to the stator.

The specified rear area is a rear half area on the surface of the claw pole in the rotating direction of the rotor. The measurement result of a temperature distribution on the surface of each claw pole in the rotor clearly indicates that the temperature at each position in a rear half area on the surface of each claw pole is higher than that of a position in a front half area on the surface of the claw pole. This result indicates that the temperature distribution at the points on the surface of each claw pole varies, namely, not uniform. It can be thereby estimated that such an eddy current is generated mainly in the rear half area on the surface of each claw pole when compared with in the front half area on the surface of the claw pole. It is therefore possible to effectively reduce the eddy current and to reduce the eddy current loss by forming the plural grooves only in the rear half area on the surface of each claw pole of the rotor. Because those plural grooves are not formed in the front half area on the surface of each claw pole, it is possible to extend an interval between the surface of each claw pole of the rotor and the surface of the stator faced to the rotor, and thereby to suppress and prevent the reduction of the output power of the vehicle alternator.

It is preferred to form the plural grooves in the rear half area on the surface of each claw pole, which is the area at the rear side on the surface of the claw pole in the rotating direction of the rotor faced to the stator. It is thereby possible to obtain both the effects of reducing the eddy current and of preventing or suppressing the reduction of the output power of the vehicle alternator.

In addition, it is preferred to set an interval between the adjacent grooves in the plural grooves to 1/4 times or less of a slot pitch of the stator, and further to set a depth of each groove to not less than 0.5 mm. This configuration ensures to reduce the eddy current generated in the plural groove formation area on the surface of each claw pole of the rotor.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
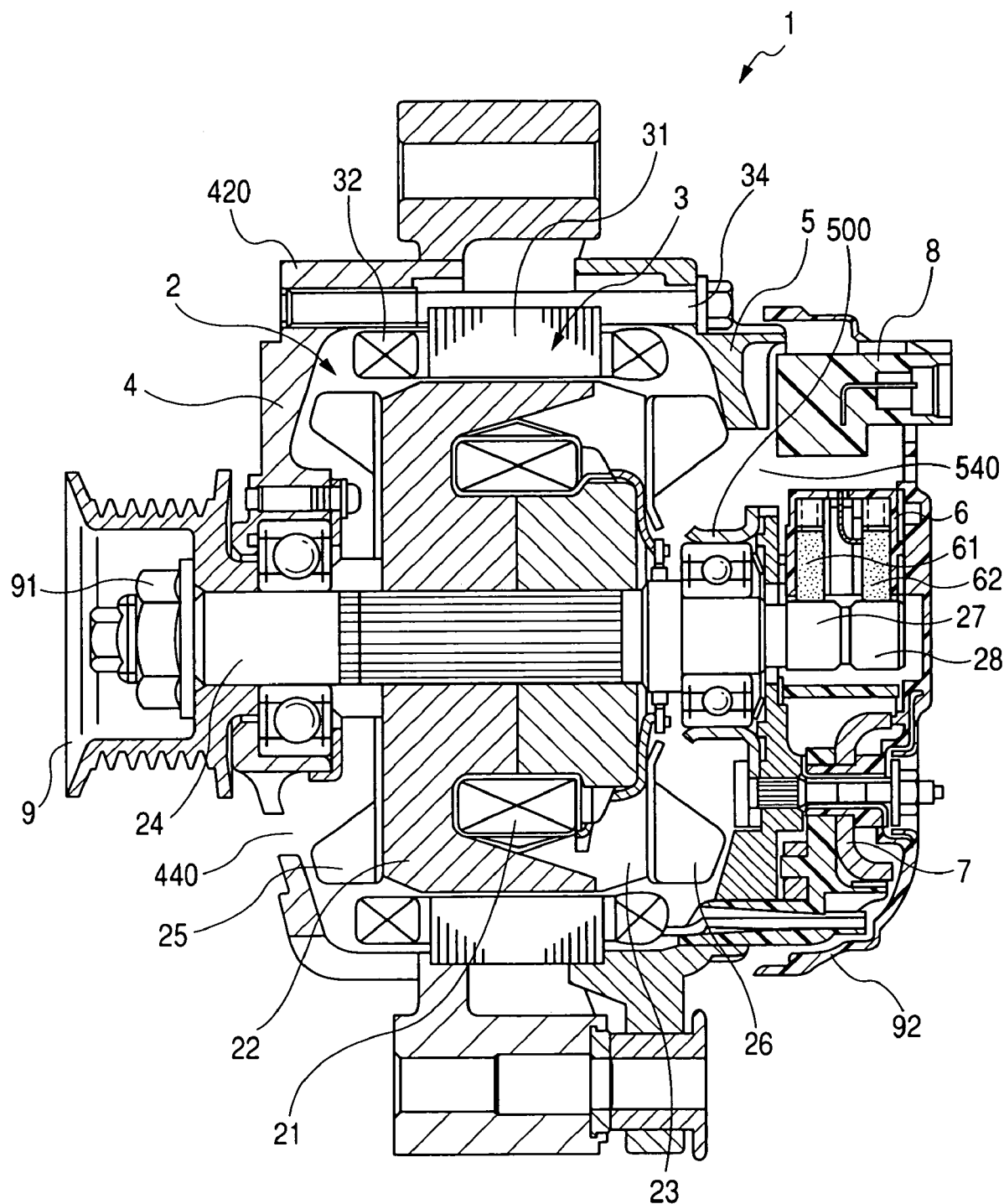
FIG. 1 is a sectional view of an entire configuration of a vehicle alternator according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of a vehicle alternator 1 according to an embodiment of the present invention with reference to FIG. 1 to FIG. 7.

FIG. 1 is a sectional view of an entire configuration of the vehicle alternator 1 according to the first embodiment of the present invention.

As shown in FIG. 1, the vehicle alternator 1 is composed mainly of a rotor 2, a stator 3, a front housing 4, a rear housing 5, a brush device 6, a rectifier device 7, a voltage regulator device 8 and a pulley 9.

The rotor 2 consists of a field winding 21, field cores 22 and 23, and a rotary shaft 24. The field winding 21 is formed by copper wires of an electric insulating treatment wound in a cylindrical shape and in a concentric configuration. The field cores 22 and 23 act as claw-shaped magnetic poles, each field core has six claw poles.

The field cores 22 and 23 are made of low carbon steel, for example. The plural grooves are formed on the surface of each of the field cores 22 and 23 in order to eliminate eddy current generated on the surface thereof. The detailed configuration of the grooves such as various shapes thereof will be explained later.

A cooling fan 25 is fixed to the end surface of the field core 22 at the front side (at the location side of the pulley 9) of the vehicle alternator 1 by welding or by another manner. The cooling fan 25 is an axial flow type or a combination of the axial flow type and a centrifugal flow type in order to flow out the cooling air sucked from the front side of the vehicle alternator 1 in the axis direction or the radius direction of the vehicle alternator 1. Similarly, a cooling fan 26 is also fixed to the end surface of the field core 23 at the rear side (opposed to the front side) of the vehicle alternator 1 by welding or by another manner. The cooling fan 26 is a centrifugal flow type in order to flow out the cooling air sucked from the rear side of the vehicle alternator 1 in the radius direction of the vehicle alternator 1.

Slip rings 27 and 28 are formed at the rear side of the rotary shaft 24 and are electrically connected to both of end terminals of the field magnetic coil 21.

Brushes 61 and 62 in the brush device 6 are assembled to the slip rings 27 and 28 by pressing those brushes 61 and 62 to the slip rings 27 and 28. An exciting current flows from the rectifier device 7 to the field magnetic coil 21 through the slip rings 27 and 28 and the brushes 61 and 62.

The stator 3 has a three-phase stator winding 32 which is wound at a specified interval around plural slots formed on the stator core 31.

The rectifier device 7 rectifies a three-phase A.C. (alternating current) voltage as the output voltage of the three-phase stator winding 32 of the stator 3, and outputs the D.C. (direct current) output voltage. The rectifier device 7 has plural rectifier elements and discharging plates formed at both of positive and negative electrode sides. The discharging plates are fixed at a specified interval to each other. The plural rectifier elements are mounted on each of the discharging plates by solder and the like.

The front side housing 4 and the rear side housing 5 accommodate the rotor 2 and the stator 3 therein. The rotor 2 is rotatably supported around the rotary shaft 24 to the front and rear housings 4 and 5. In addition, the stator 3 is placed in the outside space of the field cores 22 and 23 of the rotor 2 while keeping a specified interval between the rotor 2 and the stator 3. The stator 3 is fixed to the front side housing 4 and the rear side housing 5 by bolts 34 through four supporting parts 420 formed at a same interval along the rotating direction of the rotor 2.

The voltage regulator device 8 regulates the output voltage of the vehicle alternator 1. The output voltage of the vehicle alternator 1 is changed according to the variation of electrical loads and the amount of an electric power generation, at a constant output magnitude by controlling the exciting current flowing through the field winding 21.

The pulley 9 transmits the revolution power of an internal combustion engine (not shown) to the rotor 2 in the vehicle alternator 1 and is fixed to one end (opposite side of the slip rings 27) of the rotary shaft 24 by nuts 91. The vehicle alternator 1 has a rear cover 92 that accommodates those devices such as the brush device 6, the rectifier device 7, and the voltage regulator device 8.

Next, a description will now be given of the configuration and functions of the plural grooves 122 and 123 formed in the rear half area on the surfaces of each of the claw poles 22A and 23A as the field coils 22 and 23 of the rotor 2 with reference to FIG. 2 to FIG. 7.

Figure 2:
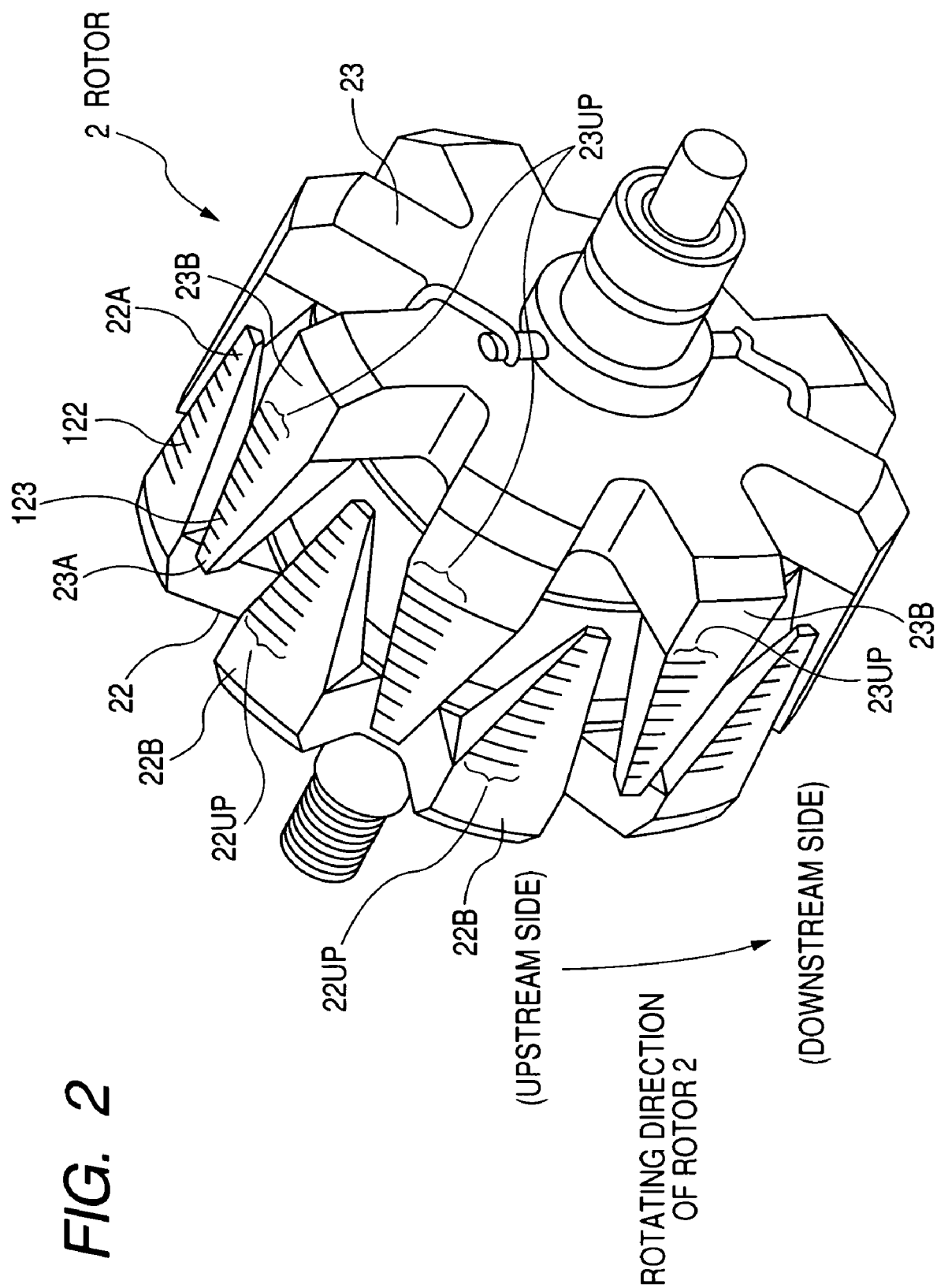
FIG. 2 is a perspective view showing an appearance of a rotor mounted on the vehicle alternator of the first embodiment shown in FIG. 1.

FIG. 2 is a perspective view showing the appearance of the rotor 2 in the vehicle alternator 1 of the first embodiment shown in FIG. 1. In particular, FIG. 2 shows the arrangement and shape of the plural grooves 122 and 123 formed on the surfaces of each claw pole as the field cores 22 and 23 and also shows a schematic configuration of the components other than the field cores 22 and 23 in the rotor 2. The cooling fans 25 and 26 are omitted from FIG. 2.

Although the configuration of the rotor 2 of the vehicle alternator 1 of the embodiment shown in FIG. 2 has the eight claw poles 22A and the eight claw poles 23A, the concept of the present invention is not limited by the conditions such as the number of the claw poles, the number of the slots, and the magnitude of a slot pitch. It is acceptable to apply the concept of the present invention to a vehicle alternator having a rotor made of another number of the claw poles, another number of the slots, or another magnitude of the slot pitch.

Figure 3:
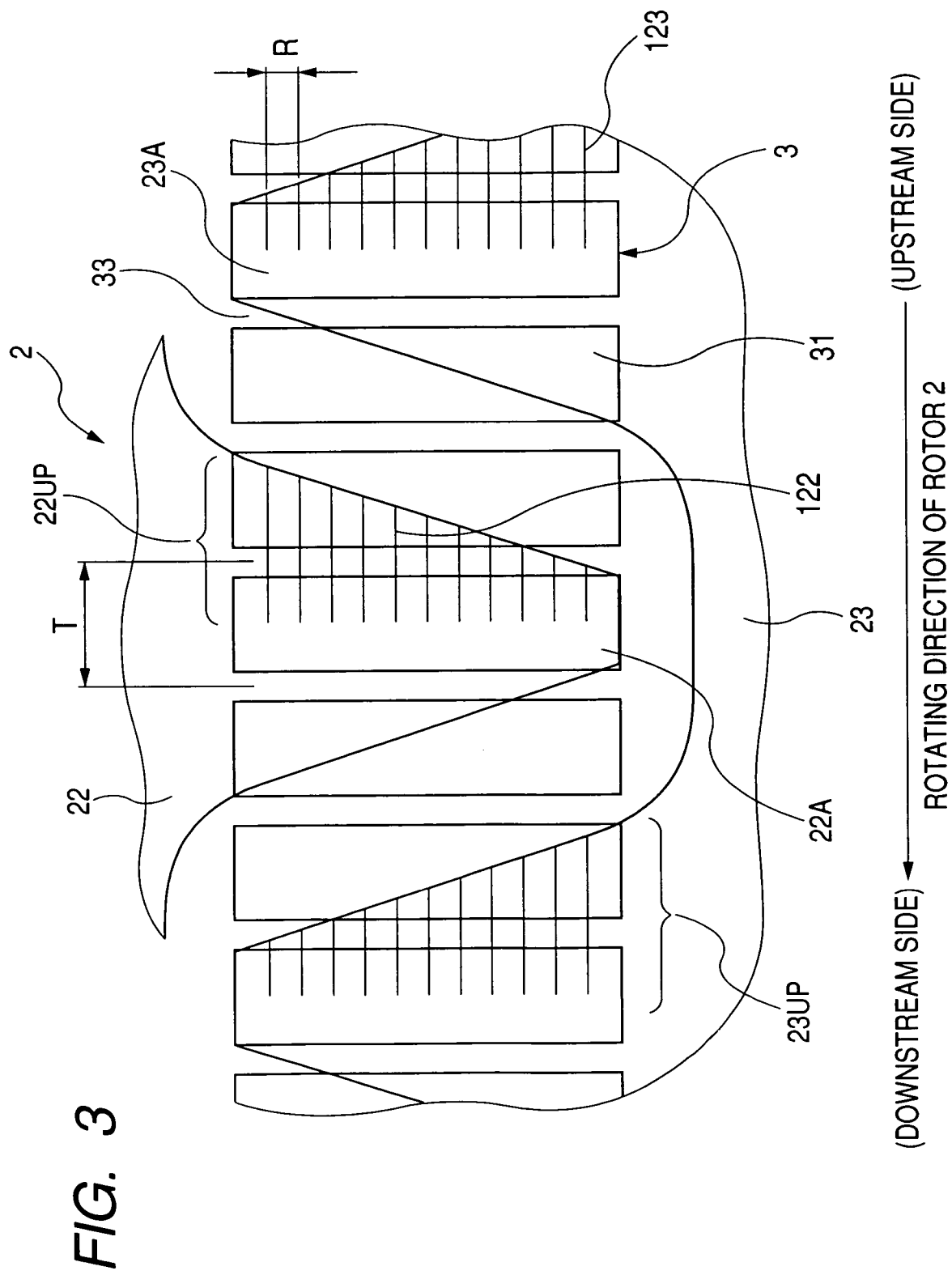
FIG. 3 is a development elevation of the rotor and a stator in a rotating direction of the rotor mounted on the vehicle alternator shown in FIG. 1.

FIG. 3 is a development elevation of the rotor 2 and the stator 3 in a rotating direction (circumferential direction) of the rotor 2 in the vehicle alternator 1 shown in FIG. 1.

As shown in both of FIG. 2 and FIG. 3, a plurality of the grooves 122 are formed in the rear half area, along the rotating direction of the rotor 2 faced to the stator core 31, designated by the upstream side 22UP on the surface of each claw pole 22A of the field core 22. For example, those plural grooves 122 are formed approximately in parallel on the surface of each claw pole 22A. Similarly, a plurality of the grooves 123 are formed in the rear half area, along the rotating direction of the rotor 2 faced to the surface of the stator core 31, designated by the upstream side 23UP on the surface of each claw pole 23A of the field core 23. Those grooves 123 are also formed approximately in parallel on the surface of each claw pole 23A. The stator 3 is omitted from FIG. 2.

The following description will be given of the configuration only of the grooves 122. The grooves 123 formed on the surfaces of the claw poles 23A of the other field core 23 have the same configuration and feature of the grooves 122.

A temperature distribution on the surface of the claw pole 22A was measured. The measurement result indicates that the temperature distribution on the surface of the claw pole 22A varies according to the measurement points on the surface shifting along the rotating direction of the rotor 2.

Figure 4:
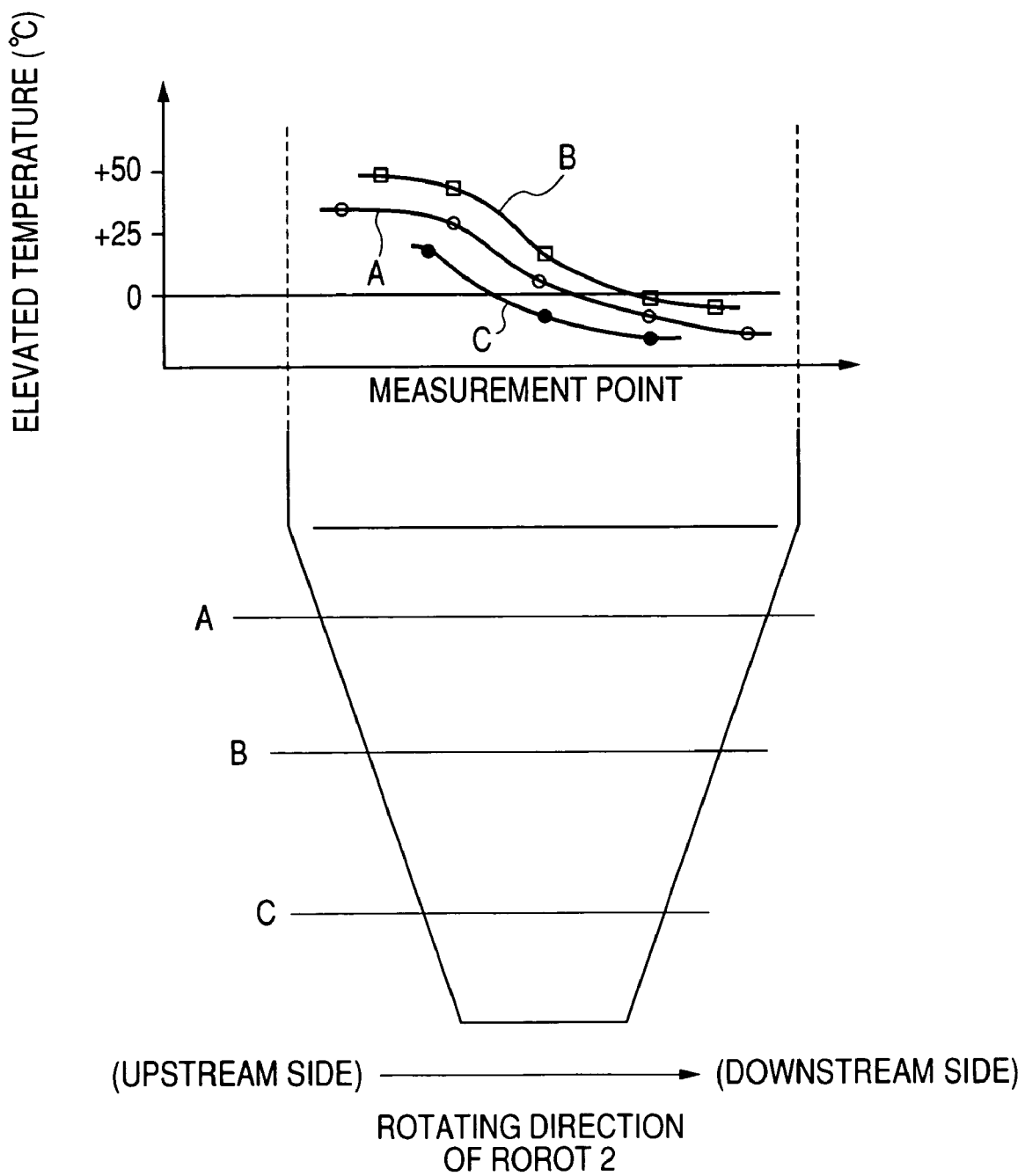
FIG. 4 is a view showing a temperature distribution of a claw pole in the rotor on which no groove is formed.

FIG. 4 shows such a temperature distribution on a surface of a claw pole forming a field core of a rotor on which no groove is formed. In FIG. 4, reference characters "A", "B", and "C" designate measurement points at which the temperature was measured, and the vertical line indicates "ELEVATED TEMPERATURE (° C.)" which is a difference in temperature between the measurement point and a reference point as the base part 22B of the claw pole 22A of the field core 22.

As clearly understood from the measurement result shown in FIG. 4, the temperature elevated area where the temperature is remarkably increased is a rear half area on the surface of the claw pole 22A. That is, it can be estimated that most eddy current is generated in the rear half area 22UP on the surface of the claw pole 22A. From the above measurement result, it is better to form the plural grooves 122 in the rear half area 22UP on the surface of the claw pole 22A in the field core 22 of the rotor 2 faced to the stator core 31 in order to effectively reduce the eddy current (namely, the eddy current loss) mainly generated at the rear half area 22UP.

Similar to the configuration of the grooves 122 of the claw pole 22A, the grooves 123 are also formed in the rear half area 23UP on the surface of each claw pole 23A in the field core 23 of the rotor 2 faced to the stator core 31 in order to effectively reduce the eddy current, namely the eddy current loss which is generated mainly at the rear half area 23UP.

Further, in order to effectively reduce the eddy current, namely the eddy current loss on the surface of each of the claw poles 22A and 23A, it is preferred to set a pitch "R" of the grooves 122 (and also to set a pitch "R" of the grooves 123) to 1/4 times or less of a slot pitch "T" (see FIG. 3) of the stator 3, and to set a depth of each groove 122 (and of each groove 123) to not less than 0.5 mm.

Figure 5A:
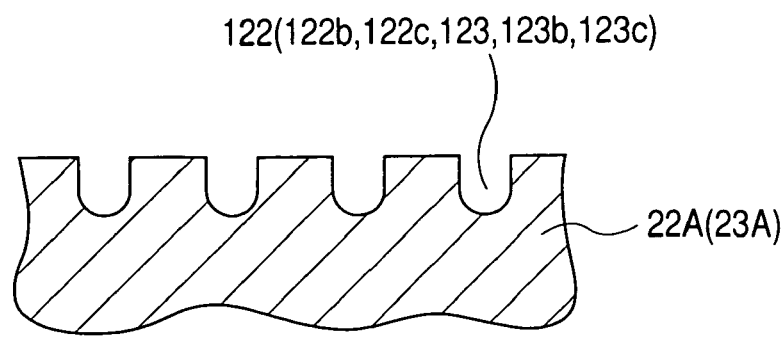
FIG. 5A, FIG. 5B, and FIG. 5C show sectional views of the grooves having various shape, formed on the surface of each claw pole of the rotor in the vehicle alternator shown in FIG. 1.
Figure 5B:
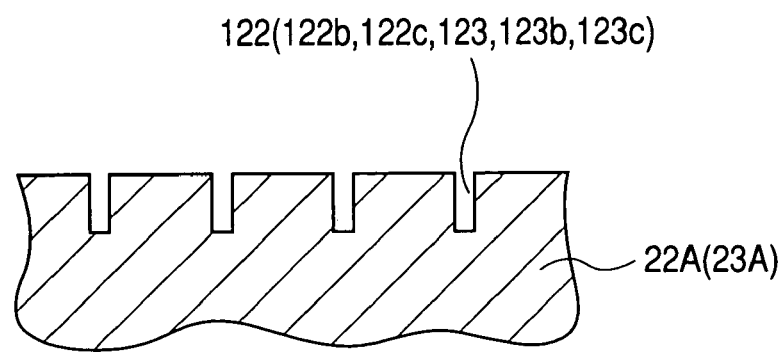
Figure 5C:
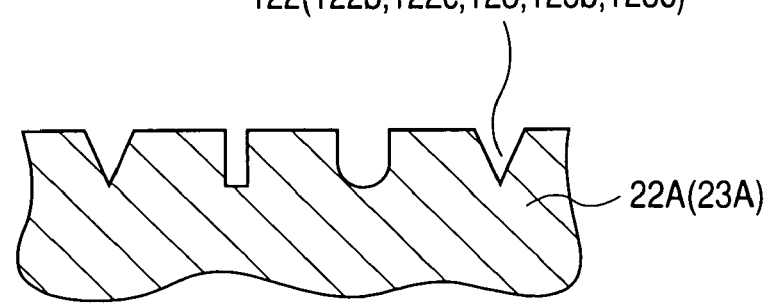
Figure 6:
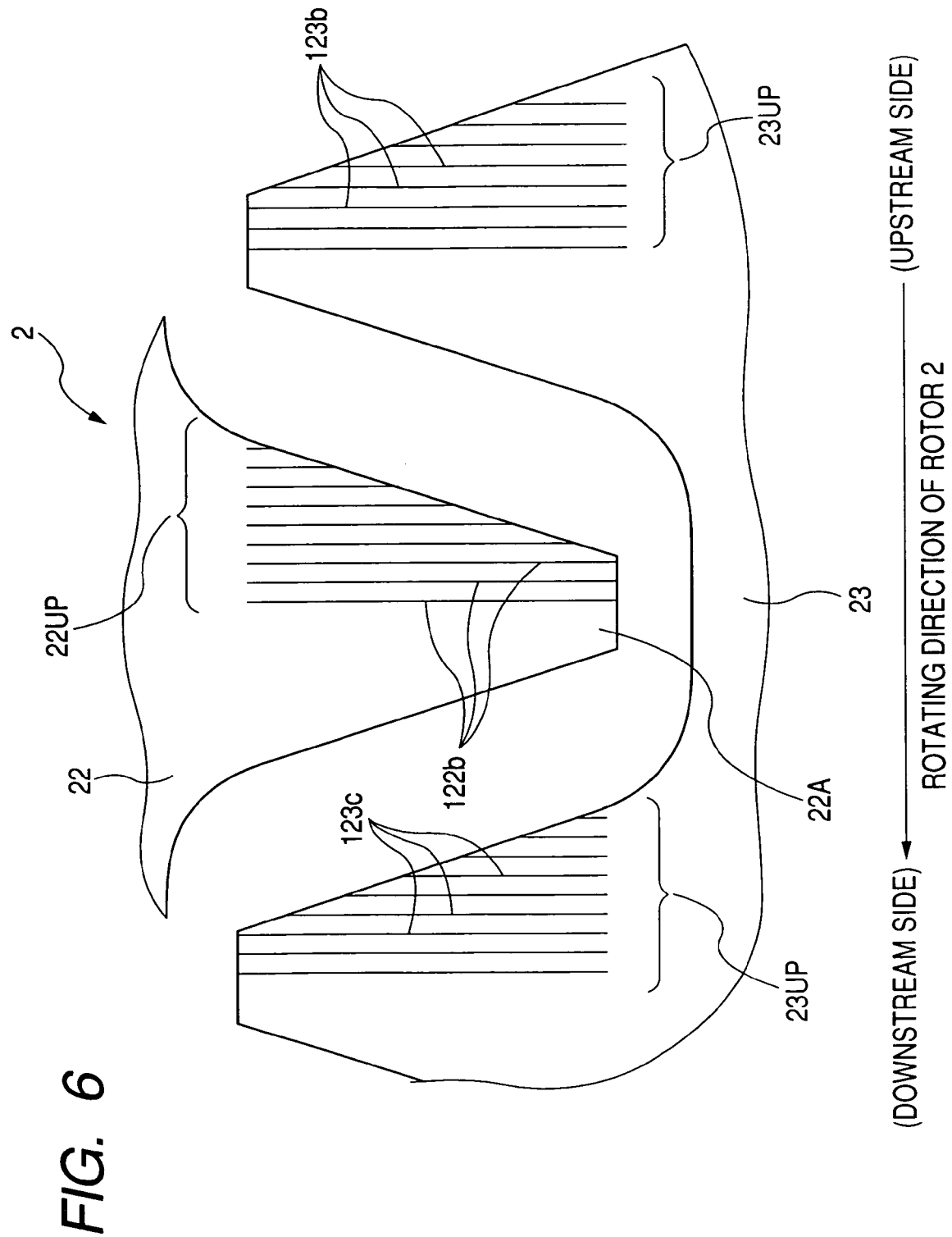
FIG. 6 is a view showing another configuration of the grooves formed on the surface of each claw pole of the rotor in the vehicle alternator of the embodiment according to the present invention.

FIG. 5A, FIG. 5B, and FIG. 5C are sectional views showing various shapes of the grooves formed in the rear half area on the surface of each of the claw poles 22A and 23A of the rotor 2 in the vehicle alternator 1. Still further, it is preferred that the shape of each of the plural grooves 122 and 123 is a U-shaped groove having a circular-arc shaped bottom (see FIG. 5A), a rectangle shaped groove having a rectangle shaped bottom (see FIG. 5B), a V-letter shaped groove having an acute-angle shaped bottom, or a combination of those shaped grooves (see FIG. 5C).

As described above, according to the vehicle alternator 1 of the embodiment of the present invention, it is possible to effectively reduce the eddy current, namely the eddy current loss by forming a plurality of the grooves 122 and 123 in the rear half areas 22UP and 23UP on the surface of each of the claw poles 22A and 23A of the rotor 2. In addition, because no groove is formed in the front half area on the surface of each claw pole, the interval between the surface of the claw pole in the front half area and the surface of the stator 3 is not enlarged. This prevents the reduction of the output power of the vehicle alternator 1. In particular, because the plural grooves 122 and 123 are formed only in the approximate rear half area on the surface of each of the claw poles 22A and 23A of the field cores 22 and 23 along the rotating direction of the rotor 2, faced to the stator 3, it is possible to obtain both the effects of reducing the eddy current, namely, the eddy current loss and of preventing the reduction of the output power of the vehicle alternator 1. Moreover, it is possible to certainly reduce the eddy current, namely the eddy current loss in the groove formation area 22UP and 23UP on the surface of each claw pole by setting the interval of the adjacent grooves 122 and the interval of the adjacent grooves 123 to 1/4 times of the slot pitch "T" of the stator 3 and by setting the depth of each groove to not less than 0.5 mm.

The concept of the present invention is not limited to the above configuration of the vehicle alternator 1. It is possible to apply the concept of the present invention to various applications. Although the embodiment described above discloses the plural grooves 122 (and 123) formed in the rear half area 22UP (and 23UP) on the surface of each claw pole in parallel to each other along the rotating direction of the rotor 2, as shown in FIG. 2 and FIG. 3, it is acceptable to form the grooves in the rear half area 22UP and 23UP along a direction that is parallel to the rotary shaft 24, as designated by the reference characters 122b and 123b shown in FIG. 6.

Figure 7:
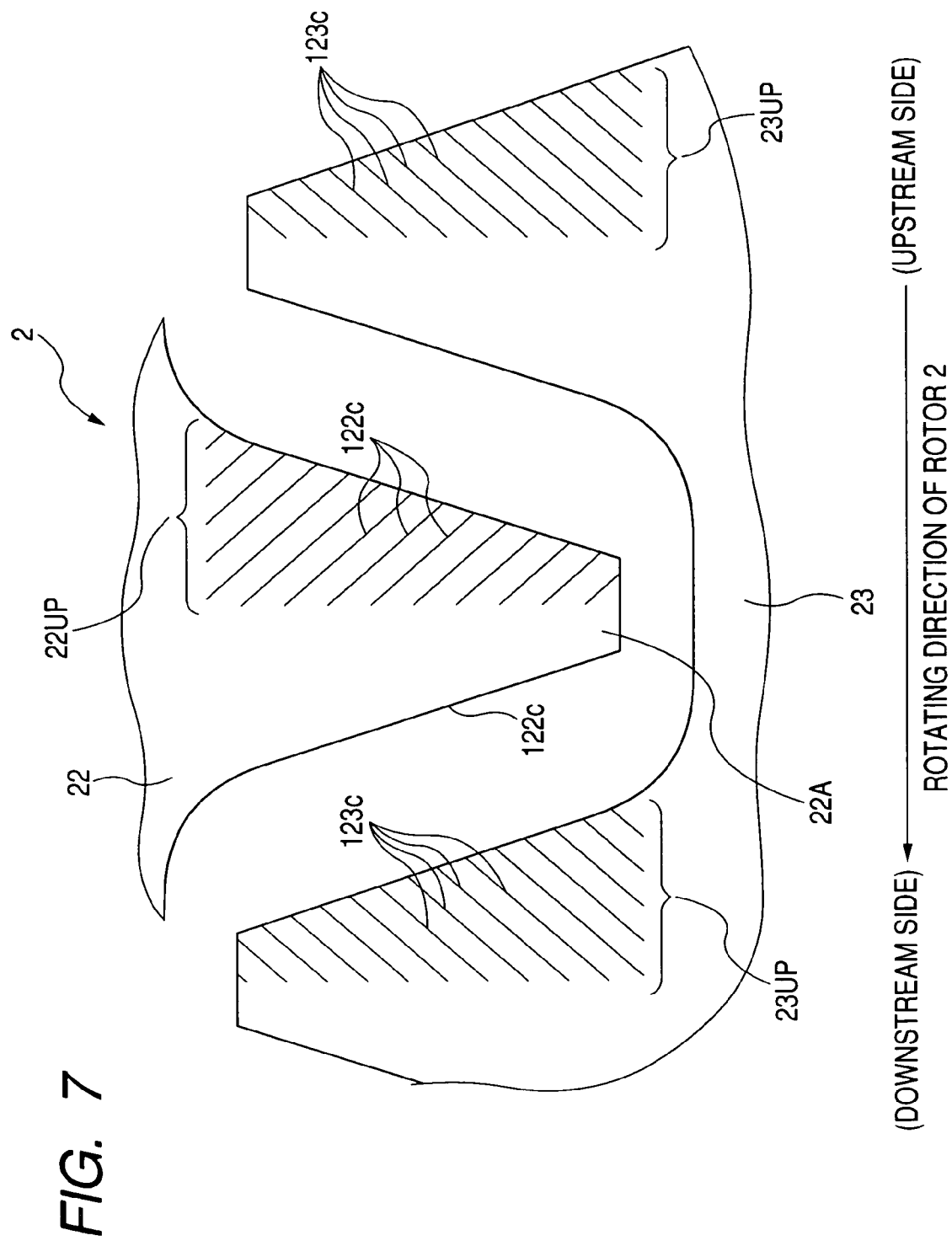
FIG. 7 is a view showing another configuration of the grooves formed on the surface of each claw pole of the rotor in the vehicle alternator of the embodiment according to the present invention.

Further, it is acceptable to form the grooves in the rear half area 22UP (and 23UP) along a slanting direction that slants to the rotating direction of the rotor 2 or slants to the direction of the rotary shaft 24, as designated by the reference characters 122c and 123c shown in FIG. 7. The stator 3 is omitted from FIG. 6 and FIG. 7.

Still further, although the above embodiment discloses the plural grooves 122 and 123 (see FIG. 3), 122b and 123b (see FIG. 6), and 122c and 123c (see FIG. 7) formed in the rear half area of each claw pole at a same pitch or a constant pitch, it is acceptable to form those plural grooves in different pitches that are changed according to the positions on the surface of each of the claw poles 22A and 23A. Furthermore, although the embodiment described above discloses the plural grooves 122 and 123 (see FIG. 3), 122b and 123b (see FIG. 6), and 122c and 123c (see FIG. 7) in parallel, it is acceptable to form those grooves not in parallel, for example, intersecting each other.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A vehicle alternator comprising:
   a rotor having a plurality of claw poles; and
   a stator placed at an outer circumference of the rotor and facing the rotor,
   wherein a plurality of grooves are formed only in a claw pole rear half area on a surface of each claw pole along a rotating direction of the rotor facing the stator, no groove being present on a claw pole front half area on the surface of each claw pole.

2. The vehicle alternator according to claim 1, wherein an interval between adjacent grooves formed on the surface of each claw pole is not less than 0.25 times a slot pitch of the stator, and a depth of each groove is not less than 0.5 mm.

3. The vehicle alternator according to claim 1, wherein each groove formed on the surface of each claw pole is at least one of a U-shaped groove having a circular arc shaped bottom, a rectangle shaped groove having a rectangle shaped bottom, and a V-letter shaped groove having an acute-angle shaped bottom.

4. The vehicle alternator according to claim 2, wherein each groove formed on the surface of each claw pole is at least one of a U-shaped groove having a circular arc shaped bottom, a rectangle shaped groove having a rectangle shaped bottom, and a V-letter shaped groove having an acute-angle shaped bottom.

5. The vehicle alternator according to claim 1, wherein each groove is formed in parallel to each other on the surface of each claw pole.

6. The vehicle alternator according to claim 2, wherein each groove is formed in parallel to each other on the surface of each claw pole.

7. The vehicle alternator according to claim 1, wherein each of the plurality of grooves is formed along a direction in parallel to a rotating direction of the rotor.

8. The vehicle alternator according to claim 1, wherein each of the plurality of grooves is formed along a direction that slants to a rotating direction of the rotor or a rotary shaft of the rotor.

* * * * *